Jan. 26, 1965     D. C. BROWN     3,167,038
COLLAPSIBLE PALLETS
Filed April 23, 1962     3 Sheets-Sheet 1
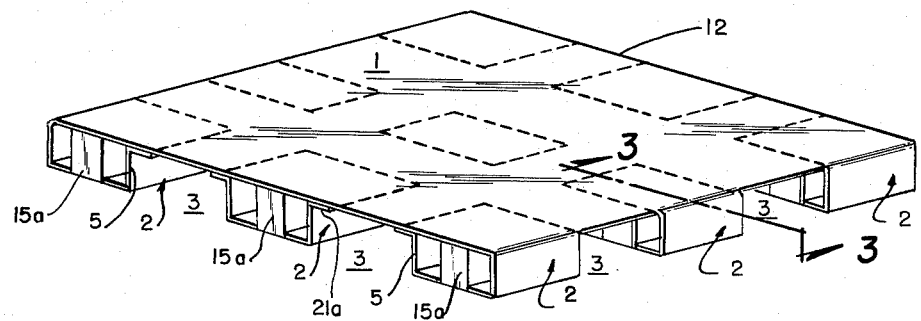
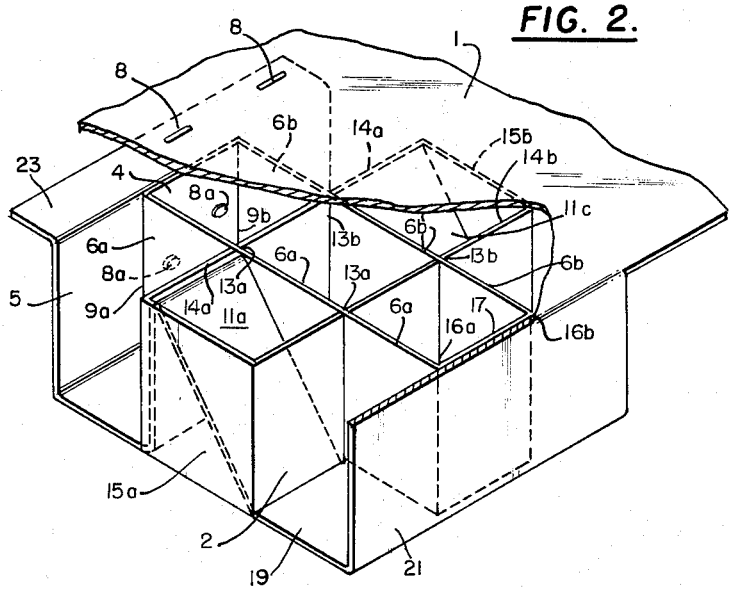
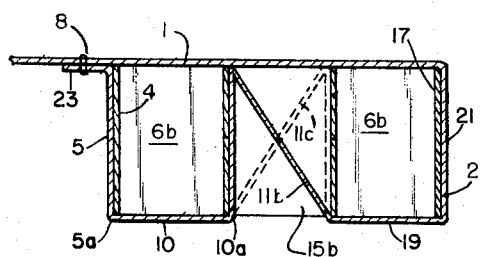
INVENTOR
Dwight C. Brown
BY John Boyle
ATTORNEY Jan. 26, 1965    D. C. BROWN    3,167,038
COLLAPSIBLE PALLETS
Filed April 23, 1962    3 Sheets-Sheet 2

INVENTOR
Dwight C. Brown
BY John Boyle
ATTORNEY

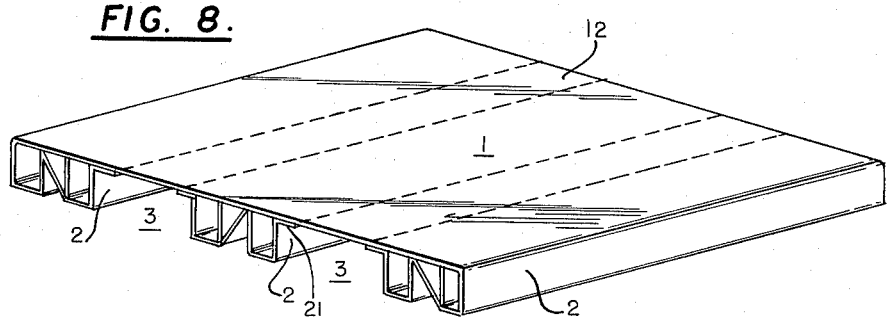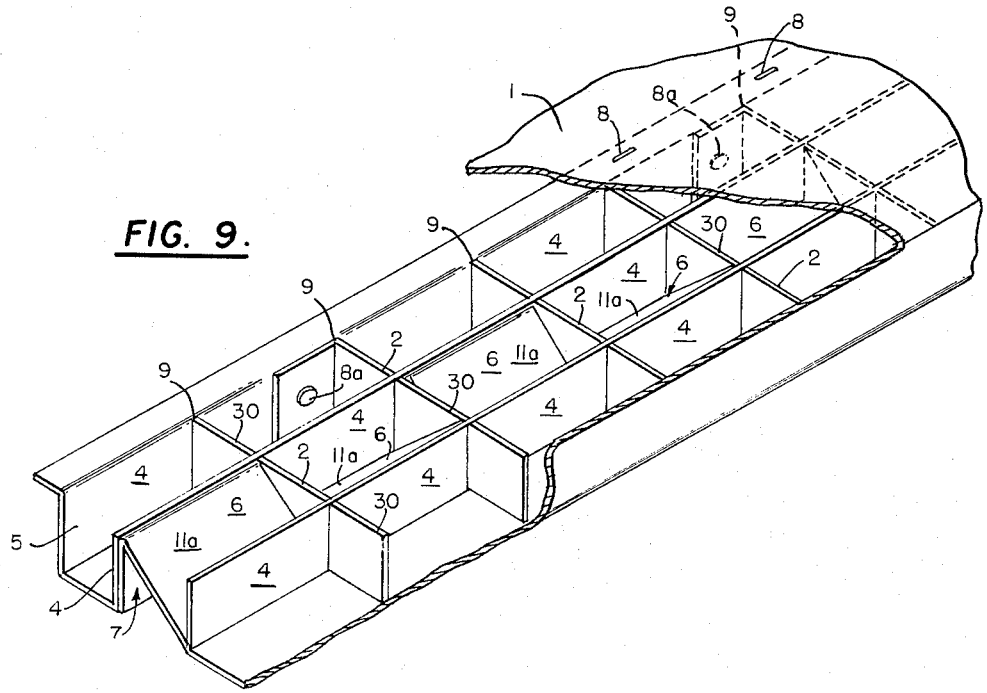

form from a set-up position and from a set-up
United States Patent Office
3,167,038
Patented Jan. 26, 1965

3,167,038
COLLAPSIBLE PALLETS
Dwight C. Brown, 414 N. Granada St., Arlington, Va.
Filed Apr. 23, 1962, Ser. No. 189,649
7 Claims. (Cl. 108—56)
(Granted under Title 35, U.S. Code (1952), sec. 266)

The invention described herein may be manufactured and used by or for the Government of the United States for governmental purposes without the payment to me of any royalty thereon, in accordance with the provisions of Title 35, United States Code, section 266.

My invention relates to folding or collapsible type pallets for use in shipping equipment and supply items and is designed to provide for unitized handling by the use of fork lift and pallet lift trucks in shipping and storage operations.

My invention has specific reference to pallets made chiefly of paperboard material of the expandable or disposal type used for initial shipment, distribution and storage, and re-use where desired, for transporting, handling, and storing materials in unit loads.

Because of its economical cost as compared with conventional rigid type wood and metal pallets, the collapsible, paperboard type of pallets as embodied in my invention may be expanded after final distribution or consumption of the materials stored and shipped thereon.

While my invention is suitably adapted to fabrication from paperboard material, it can be fabricated either wholly or in part from sheet metal, plastics, plywood, veneer and laminated material having a wood veneer core with paper or paperboard on one or both sides.

The term "paperboard" as used herein refers to and includes corrugated board, fibreboard and other fibrous products that are capable of supporting relatively medium and heavyweight loads. The paperboard material may be treated wholly or in part with resins, inorganic silicates, glues, synthetic rubber compounds, insecticides, corrosion inhibitors, moisture proofing materials, plastics and similar type materials for stiffening and strengthening.

One of the objects of my invention is to provide an inexpensive, light-weight pallet having a flat deck with integral, collapsible supports, which provide a quick and easy means of setting up the pallet for use from a knock down position to a set-up position and from a set-up position to a knock down, substantially flat form for return shipment or storage for re-use, if so desired.

Another object is to provide an integral pallet having substantially flat form when not set up for use, with integral foldable or collapsible supports, so designed and constructed as to enable instantaneous set-up when needed without the use of any tools and without any added parts, fabrication, fastenings, or separate insertions for such set-up. My pallet avoids the disadvantages of permanently set-up, rigid pallets which take up considerably more cubic space during transportation and storage, prior to use or during return shipment or storage pending re-use.

A further object is to provide a pallet with integral support members, so designed as to be folded or collapsed against the top underside of the pallet deck when not in use, enabling the distribution of a complete pallet in substantially flat form. By having the underlying supports integral with the overlying deck, it dispenses with added separable parts to give the unit the required strength.

A still further object is to provide lightweight, inexpensive, folding supports for attachment by glue, staples, adhesive tape, or other similar means to the bottom of a flat deck frame, or the bottom of a large container, forming a pallet or pallet arrangement when set up, enabling the load to be handled by the use of fork lift and pallet lift trucks.

Referring to the drawings for a more complete disclosure of the invention:

FIGURE 1 is a top perspective view of one form of a pallet, having integral collapsible support units, in a set-up position adapted for use as a four-way entry fork lift pallet;

FIGURE 2 is a top perspective view of the support unit shown at the lower corner of FIG. 1, with a fragment of the overlying deck;

FIGURE 3 is a vertical section of the support unit and deck on the line 3—3 of FIG. 1;

FIGURE 8 is a top perspective view of a modified form of pallet, having collapsible support units, in a set-up position, adapted for use only as a two-way entry fork lift pallet;

FIGURE 9 is a top perspective view of the modified form of the support unit shown in FIG. 8, with a fragment of the overlying deck.

Figure 5:
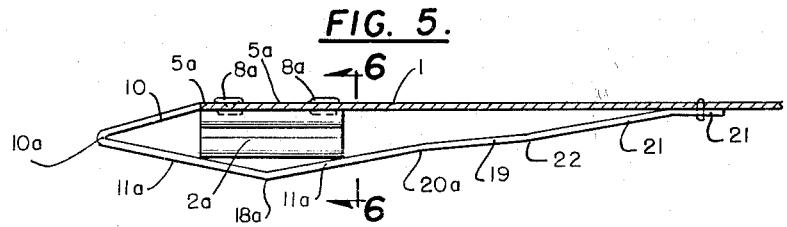
FIGURE 5 is a section of a pallet in a collapsed position, on the line 5—5 of FIG. 7.
Figure 6:
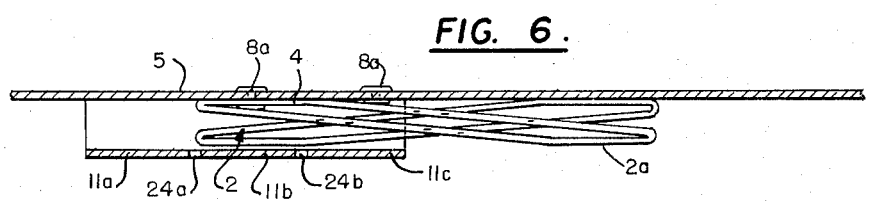
FIGURE 6 is a section of the pallet in a collapsed position, on the line 6—6 of FIG. 5.
Figure 7:
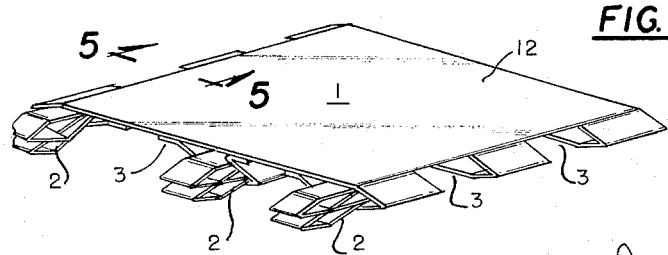
FIGURE 7 is a top perspective view of the four-way fork lift pallet of FIG. 1 with the support units in a collapsed position.

Referring to FIGS. 1 and 7, the top supporting surface, or deck 1, of the pallet 12 is provided on its underside with nine spaced, foldable, collapsible, support units 2. The units 2 can be folded flat against the underside of the deck 1 of the pallet 12 in a knock down position, as shown in FIGS. 5, 6, and 7. The spaces 3, FIGS. 1 and 7, between the units 2 permit the entry of lift truck forks on any of the four sides of the pallet 12.

Referring to FIG. 8, instead of the pallet 12 having a four-way fork lift entry as in FIG. 1, it has only a two-way fork lift entry. This is accomplished by having three parallel, spaced, foldable, collapsible, honey-comb support units 2. The spaces 3 between the units 2 permit the entry of lift truck forks only in two positions. In each case the support unit 2 comprises a collapsible cellular supporting base 2a permanently attached to a collapsible carrier and reinforcing component 2b.

Referring to FIG. 2, the side 4 of the collapsible supporting base 2a is fixedly secured to the carrier part 5 of the carrier and reenforcing component 2b by fasteners 8a. Pivoted to the side 4 along its edges 9a and 9b are the two parallel spaced parts 6a and 6b which are adapted to fold flat against the side 4 and part 5. The deck 1 is secured to a fastening flap along top of part 5 by fasteners 8. Pivotally connected to the parts 6a and 6b, intermediate their ends, at 13a and 13b, are the parallel spaced sides 14a and 14b. Pivotally connected to the ends of the spaced sides 14a and 14b are the parallel sides 15a and 15b. Pivotally connected to the ends 16a and 16b of the parts 6a and 6b, respectively, is the part 17.

Figure 4:
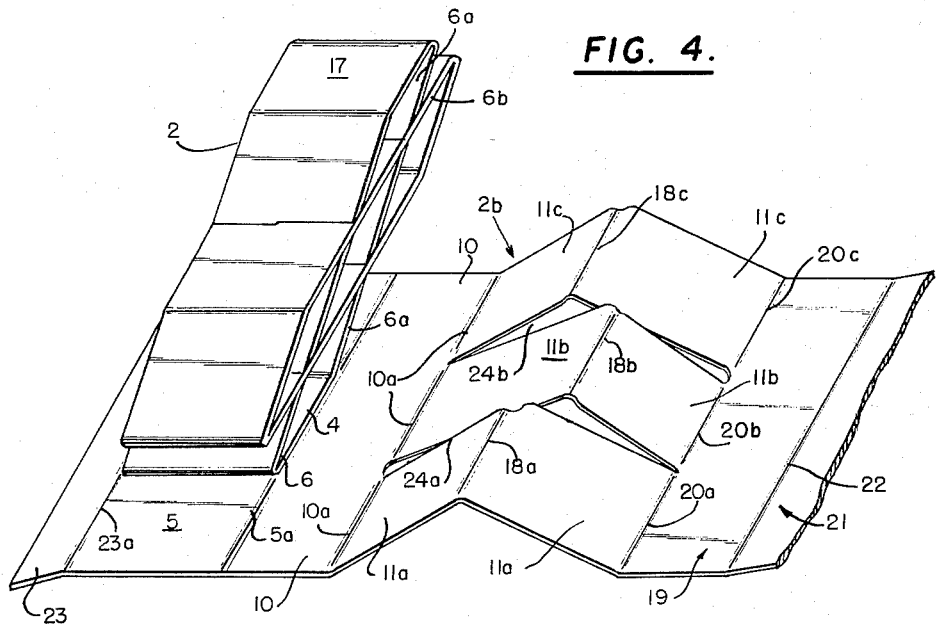
FIGURE 4 is an exploded, fragmentary perspective view of a support unit in a partially collapsed position, with the enveloping sides, bottom and reinforcement components in an unfolded, disassembled position.

Referring to FIG. 4, pivotally connected to the part 5 along its longitudinal edge 5a is the bottom part 10. Pivotally connected to the opposite longitudinal edge 10a of the part 10 are the three inserts 11a, 11b, and 11c, formed by the slits 24a and 24b in the cardboard sheet. Each of the three inserts 11a, 11b, and 11c, is in two parts, hinged together at 18a, 18b, and 18c, and pivotally connected to the bottom part 19 along the edges 20a, 20b, and 20c. The part 19 is pivotally connected to the side part 21 along the edge 22. On the opposite edge of the part 5 is part 23, pivotally connected thereto at 23a. Since the part 4 of the support unit 2 is fixedly secured to the part 5, the base 2a is free to move from the partially collapsed position of FIG. 4 to either the fully collapsed position of FIGS. 5, 6, and 7, or to the set-up position of FIG. 2. The part 21 may have a hinge fastening flap 21a, as shown in the middle unit in FIG. 1, or may be hinged to an edge of the deck 1 as shown in FIGS. 1, 2, 3, and 8 at an end unit. Parts 5, 10, 11a, 11b, 11c, 19, 21, and 23, and 21a, if present, form together the carrier and reenforcing unit 2b for the collapsible supporting base 2a. Flap 21a, if present, is secured to underside of deck 1 at 21b.

Referring to FIGS. 2 and 3, wherein the support unit 2 is in the assembled set-up position, the inserts 11a, 11b, and 11c, FIG. 4, will be in tight frictional engagement with the sides 6a and 6b, 15a and 15b of respective cells of the supporting base.

Referring to FIGS. 5 and 6, the collapsed support base 2a is secured to the part 5 by the staples 8a which pass through the part 5 and the part 4 (FIG. 2).

Referring to FIG. 5, the part 10 is pivoted at one side to part 5 at 5a and at the other side is pivoted to parts 11a, 11b, and 11c as at 10c.

Referring to FIG. 6, there is shown the side 4 of the folding base 2a secured to part 5 by staples 8a. The three inserts 11a, 11b, and 11c are formed by the slits 24a and 24b, FIG. 4.

Referring to FIG. 9, the supporting base units 2a are fixedly secured to the part 5 by the staples 8a. The base units 2a are formed by the parallel sides 30 at right angles to the parallel sides 4 when in a set-up position. The sides 30 and 4 of the base units 2a are pivotally interconnected and can be folded flat against the part 5, by rotating the units 2a on the pivots 9.

In the set-up position, the middle longitudinal row of cells enclose the folded inserts 6, having a vertical portion 7 and an inclined portion 11a. In alternate cells lengthwise of the unit, the inclined parts 11a slant in opposite directions and are pivotally connected at their ends to the adjacent vertical portions.

My invention as disclosed herein is a modification of the pallet disclosed in my application Serial Number 586,889, filed May 23, 1954, now Patent No. 3,041,029, and incorporates additional novel features.

The cellular partitioning 2a is enveloped by a cover 2b which folds for insertion of a part into the cells to provide rigidity and strength to the unit in set-up position. Parts 10, 19 of the cover which lie flat under the vertical cellular walls provide a horizontal under-deck which gives maximum support to the unit. The cover serves to hold the vertical cellular walls in position to provide maximum rigidity.

The partitioning is stapled or fastened by other means to the side of the fold-over cover of the support and may be an integral part of the pallet deck requiring fastening only at one end.

The fold-over cover with the cellular partitioning can be fabricated as a separate unit and attached to a flat deck or the bottom of a box to form a pallet base for fork lift truck handling.

Assembling the parts to a set-up position for use or in disassembling to a knock down flat, folded position can be accomplished easily and quickly without use of tools, tabs, or other accessories.

I claim:

1. A pallet of the character described, comprising a pallet deck, a collapsible cellular supporting base and a collapsible carrier and reenforcing unit for the base, said unit having opposite ends hingedly attached to the underside of said deck and collapsible thereagainst, said base having one side attached to said unit and collapsible thereagainst, said unit having reenforcement portions insertable into receptive cells of said base when set up, and said joined base and unit being collapsible together against the underside of said deck.

2. A pallet of the character described comprising, a deck, a carrier part hinged at its upper edge to the underside of the deck to extend at right angles to the deck and to be swung to place one side flatwise against the under surface of the deck, a supporting base carried by said carrier part and comprising a plurality of open ended cells hinged together to be folded flat and to be extended into set up cellular configuration, one side of said supporting base being attached to the other side of said carrier part to swing therewith relatively to said deck, and a reenforcing sheet having one edge hingedly attached to the lower edge of said carrier part and being slit and scored into reenforcing sections, each having two parts bendable into set up angular relationship to each other and to the contiguous portions of said sheet, said sheet being swingable relatively to said carrier part into position beneath said supporting base and each of said reenforcing sections when set up being removably insertable into reenforcing position with a cell of said supporting base when in set up configuration.

3. A pallet as set forth in claim 1 and in which said reenforcing sheet has an end portion bendable into position along the opposite side of said supporting base when set up and hingedly attached at its free end to the underside of said deck.

4. A pallet of the character described comprising, a deck and a collapsible and extensible carrier member of general U-shape having the free ends of the legs of the U hingedly attached to the underside of the deck and the other ends of said legs hingedly attached to the ends of the cross-piece of the U whereby said legs and cross-piece may be folded flatwise parallel to the under surface of the deck and may be extended therefrom into U-shape, and a collapsible cellular supporting unit having one side disposed against the inside surface of one of said U legs and secured thereto, whereby said supporting unit may be alternately collapsed and set up on said leg and the carrier member with the collapsed supporting unit attached thereto may be folded against the underside of said deck.

5. A pallet as set forth in claim 4 and in which the cross-piece of said U-shaped carrier member is slit and and scored to provide sections bendable into reenforcements removably insertable into respective cells of the supporting unit when set up.

6. A collapsible support for a pallet or the like, comprising a supporting base comprising a plurality of open-ended cells having their side walls hinged together at their meeting edges so that the base is foldable from cellular set up configuration to flat collapsed configuration and vice versa, and a carrying reenforcing unit for said base, said unit having a portion thereof slit and scored into reenforcing sections each having two parts bendable into angular relationship to each other and to the contiguous portions of said unit, each section when so bent being removably insertable into a cell of said supporting base in reenforcing engagement with the walls of the cell, said unit having an end portion abutting flatwise against a side of said supporting base and attached thereto, whereby when said reenforcing sections are removed from the cells said supporting base may be collapsed flat on said unit and a portion of said unit may be folded down on said attached collapsed base.

7. A collapsible support for a pallet or the like as set forth in claim 6, and in which said carrying and reenforcing unit has a portion at its opposite end bendable to lie along the opposite side of said supporting base when set up, the end portions of said unit being adapted to be hingedly attached to the underside of a pallet deck.

(References on following page)

References Cited by the Examiner

UNITED STATES PATENTS

| | | | |
|---|---|---|---|
| 2,444,183 | 6/48 | Cahners | 108—56 |
| 2,503,240 | 4/50 | Cahners | 108—56 |
| 2,692,747 | 10/54 | Strauss | 108—56 |
| 2,696,356 | 12/54 | Baumann | 108—56 |
| 2,728,545 | 12/55 | Hermitage | 108—56 |
| 2,957,668 | 10/60 | Norquist et al. | 108—56 |
| 2,958,494 | 11/60 | Lovegreen | 108—56 |
| 3,007,663 | 11/61 | Huck | 108—57 |
| 3,041,029 | 6/62 | Brown | 108—56 |

FRANK B. SHERRY, *Primary Examiner.*